United States Patent [19]

Reitmeier

[11] Patent Number: 4,502,074
[45] Date of Patent: Feb. 26, 1985

[54] DIGITAL TELEVISION SIGNAL PROCESSING SYSTEM

[75] Inventor: Glenn A. Reitmeier, Trenton, N.J.
[73] Assignee: RCA Corporation, New York, N.Y.
[21] Appl. No.: 319,459
[22] Filed: Nov. 9, 1981
[51] Int. Cl.$^3$ .............................................. H04N 9/535
[52] U.S. Cl. .......................................... 358/23; 358/40
[58] Field of Search .................... 358/13, 14, 21 R, 23, 358/30, 37, 40, 319, 320, 339, 337

[56] References Cited

U.S. PATENT DOCUMENTS

| | | | |
|---|---|---|---|
| 4,270,139 | 5/1981 | Flamm et al. | 358/23 |
| 4,328,426 | 5/1982 | D'Ortenzio | 250/578 |
| 4,333,104 | 6/1982 | Geller | 358/23 |

FOREIGN PATENT DOCUMENTS

| | | |
|---|---|---|
| 045596 | 8/1980 | European Pat. Off. |
| 023555 | 2/1981 | European Pat. Off. |
| 1377684 | 12/1974 | United Kingdom |
| 2022954A | 12/1979 | United Kingdom |
| 2034146A | 5/1980 | United Kingdom |
| 2087191A | 5/1982 | United Kingdom |

OTHER PUBLICATIONS

Article "Color Decoding a PCM NTSC Television Signal" by J. P. Rossi, Jun., 1974, Journal of the SMPTE, vol. 83, No. 6, pp. 489-495.
Article "Digital Television Image Enhancement" by J. P. Rossi, 1975, Journal of the SMPTE, vol. 84, at pp. 545-551.
Text "Theory and Application of Digital Signal Processing" by Rabiner and Gold, (Prentice-Hall, 1975), p. 550.
Paper "Nonrecursive Digital Filters with Coefficients of Powers of Two" by A. Tomozawa, in the IEEE Int'l. Conf. on Comm., pp. 18D-1 through 18D-5.
Paper "Colour Demodulation of an NTSC Television Signal Using Digital Filtering Techniques" by A. G. Deczky, 1975 IEEE Int'l. Conf. on Comm., vol. II, pp. 23-6 through 23-11.
U.S. patent application filed Aug. 31, 1981 in the name of H. G. Lewis, Jr., Digital Color Television Signal Demodulator, Ser. No.: 297,556.
An Approach to the Implementation of Digital Filters by L. R. Jackson, reprinted from IEEE Trans. Audio Electroacoust., vol. AU-16, pp. 413-421, Sep. 1968.
W. Weltersbach et al., "Digitale Videosignalverarbeitung im Farbfernsehempfänger", *Fernseh und Kino-Technik*, 35 Jahrgang, Nr. 9, Sep. 1981, pp. 317-323, (with translation).
T. Fischer, "Digital VLSI Breeds Next-Generation TV Receivers", *Electronics*, Aug. 11, 1981, pp. 97-103.
T. Fischer, "Fernsehen Wird Digital", *Elektronik*, No. 16, 1981, pp. 27-35, (with translation of pp. 30-31).
ITT Intermetall, *A New Dimension-VLSI Digital TV System*, Sep. 1981, pp. 1-23.

Primary Examiner—Tommy P. Chin
Attorney, Agent, or Firm—E. M. Whitacre; P. J. Rasmussen; E. P. Herrmann

[57] ABSTRACT

A system is provided for filtering and demodulating digital color mixture signals, wherein the signals are filtered to remove out-of-band noise prior to completion of the demodulation process. Interleaved digital chrominance signal samples are first demodulated by a signal related in frequency to the video subcarrier to obtain interleaved color mixture signal samples of different sampling phases at baseband frequencies. The interleaved color mixture signal samples are applied to a digital filter at a rate which is a multiple of the color subcarrier frequency. The weighting coefficients of the filter are selected to obtain a bandwidth which passes the color mixture signal while removing out of band noise. Since the input signal sequence to the digital filter contains interleaved color mixture signal samples, alternate stages of the filter shift register are tapped, so that the output sequence will comprise filtered and interleaved color mixture signal samples. An output sampling switch accomplishes phase demodulation of the output sequence by selecting samples at a reduced sampling rate in accordance with the Nyquist criterion of the color signals and produces either one or two output sequences of filtered and fully demodulated color mixture signals. Tapped shift register stages of the digital filter may be coupled to two different sets of weighting coefficients and signal combining stages. The filter outputs may thus exhibit unequal bandwidths for filtered color mixture signals, which are commensurate with the desired bandwidths of the filtered signals.

11 Claims, 8 Drawing Figures

DIGITAL TELEVISION SIGNAL PROCESSING SYSTEM

This invention relates to digital television signal processing systems and, in particular, to digital color signal filter and demodulation systems.

When an analog video signal is to be processed digitally in a television receiver, it is necessary to first digitally encode the video signal in an analog-to-digital converter. The analog-to-digital converter samples the video signal in accordance with the Nyquist criterion at a rate which is generally related to the color subcarrier frequency (e.g., three times or four times the color subcarrier frequency). If an NTSC video signal is sampled at a rate of four times the color subcarrier ($4f_{sc}$), the signal samples consist of sums and differences of luminance and chrominance information signals. Specifically, if the sampling phase coincides with the zero degree axis of the color burst signal, the chrominance portion of the samples occur in the sequence $-(B-Y)$, $(R-Y)$, $(B-Y)$ and $-(R-Y)$. If the sampling phase coincides with the I axis of the color burst signal (57°), then the chrominance samples occur in the sequence I, Q, $-I$, and $-Q$. After digital encoding, luminance and chrominance information may be separated by comb filtering or horizontal filtering to produce a sequence of luminance signal samples and a sequence of color mixture signal samples, the latter being of either the $-(B-Y)$, $(R-Y)$ form or the I, Q form. At this point, both signals usually occur at the rate of the sampling signal used by the analog to digital converter. While the high sampling rate must generally be maintained in the luminance channel, the lower bandwidth color signals may have their sampling rate decreased in accordance with their Nyquist criterion.

The color mixture signal sequences described above for the $4f_{sc}$ sampling rate are modulated at the color subcarrier frequency, with each signal sample being a unique piece of chrominance information. Accordingly, quadrature demodulations can be accomplished by selecting alternate samples at two outputs at a rate of two times the color subcarrier. For color signals of the $-(B-Y)$, $(R-Y)$ form, the two demodulated color signal sequences are $-(B-Y)$, $(B-Y)$, $-(B-Y)$, $(B-Y)$ and $(R-Y)$, $-(R-Y)$, $(R-Y)$, $-(R-Y)$, both at a rate of twice the color subcarrier frequency ($2f_{sc}$). Similarly, for color signals of the I, Q form, the demodulated color signal sequences are I, $-I$, I, $-I$, and Q, $-Q$, Q, $-Q$, also at the $2f_{sc}$ rate.

In the NTSC system, the color mixture signals commonly occupy bandwidths of 0-0.5 MHz for the (B-Y), (R-Y) and Q signals, and 0-1.5 MHz for the I signal. Accordingly, sampling at a rate of $2f_{sc}$ is excessive by comparison with the Nyquist sampling rates associated with these bandwidths, and undesirably includes high frequency noise in the color signals. It is therefore desirable to reduce the sampling rate of the color signals, which also reduces the complexity of subsequent color signal processing circuitry. One way of doing this is simply to discard signal samples. However, since each chrominance sample was uniquely derived, the samples may include out of band noise, which will alias into the color signals if samples are simply discarded. It is thus desirable to reduce the sampling rate of the chrominance signals and eliminate out of band noise in a system which utilizes a simple circuit configuration.

In accordance with the principles of the present invention, a system is provided for filtering and demodulating digital color mixture signals, wherein the signals are filtered to remove out-of-band noise prior to completion of the demodulation process. In a first embodiment of the invention, interleaved digital chrominance signal samples are first demodulated by a signal related in frequency to the video subcarrier to obtain interleaved color mixture signal samples of different sampling phases at baseband frequencies. The interleaved color mixture signal samples are applied to a digital filter at a rate which is a multiple of the color subcarrier frequency. The weighting coefficients of the filter are selected to obtain a bandwidth which passes the color mixture signal while removing out of band noise. Since the input signal sequence to the digital filter contains interleaved color mixture signal samples, alternate stages of the filter shift register are tapped, so that the output sequence will comprise filtered and interleaved color mixture signal samples. An output switch accomplishes phase demodulation of the output sequence by selecting samples at a reduced sampling rate in accordance with the Nyquist criterion of the color signals and produces either one or two output sequences of filtered and fully demodulated color mixture signals.

In accordance with a further aspect of the present invention, tapped shift register stages of the digital filter are coupled to two different sets of weighting coefficients and signal combining stages. The filter outputs may thus exhibit unequal bandwidths for filtered I and Q signals, which are commensurate with the desired bandwidths of the filtered signals.

Figure 1:
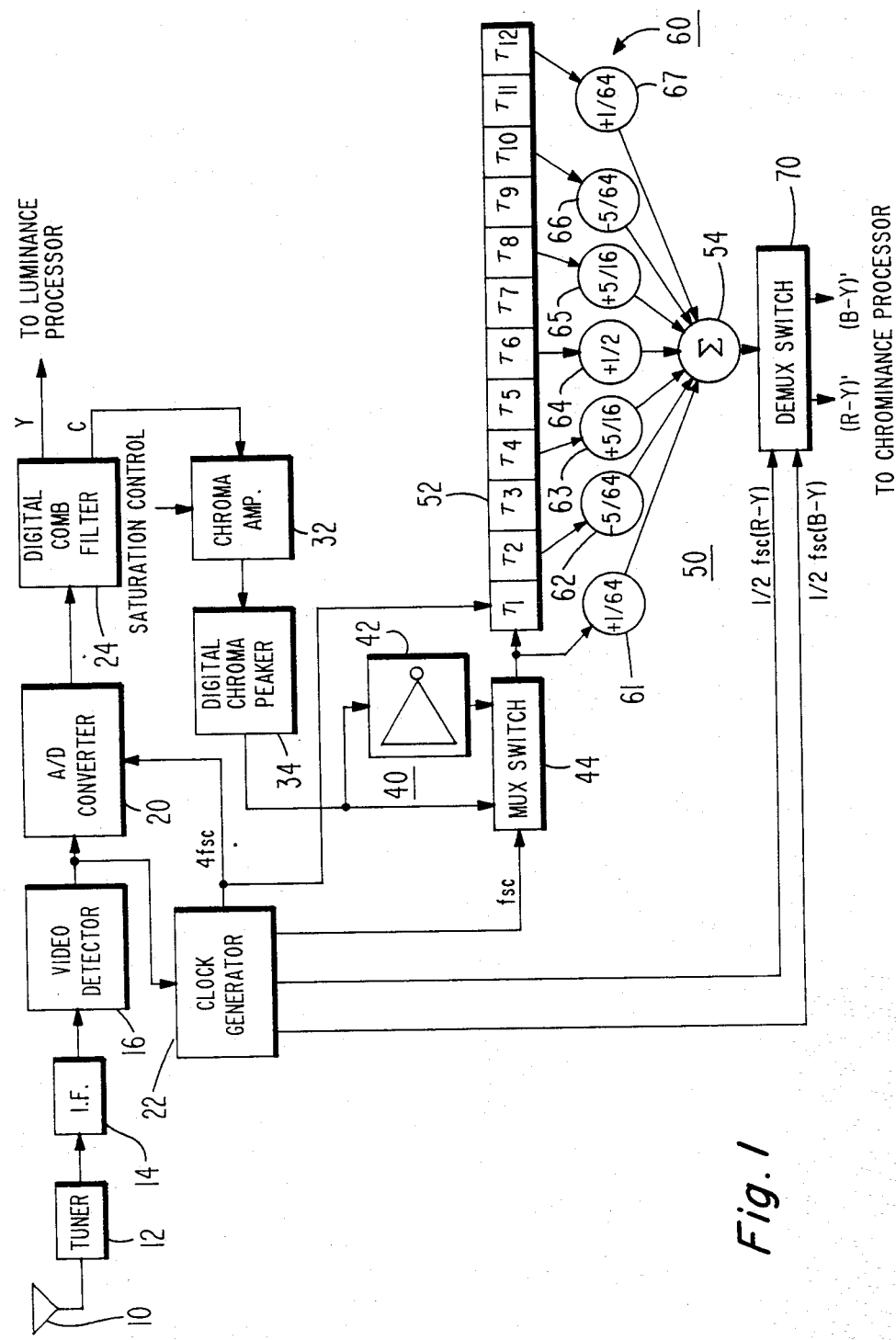
FIG. 1 illustrates, in block diagram form, a portion of a television receiver including a filtering and demodulation system constructed in accordance with the principles of the present invention.

In FIG. 1, a television signal is received by an antenna 10 and successively processed by a tuner 12, intermediate frequency circuits 14, and a video detector 16, which are constructed in a conventional manner. The detected video signal at the output of the detector 16 is applied to the input of an analog to digital (A/D) converter 20. The A/D converter 20 samples the video signal at a rate equal to four times the color subcarrier frequency ($4f_{sc}$), and produces digital samples of the video signal at this rate. Each digital sample, or word, may comprise, for example, eight bits produced in parallel. In an eight-bit system, the analog video signal will be quantized to one of two-hundred and fifty-six discrete levels. The $4f_{sc}$ sampling clock for the A/D converter 20 is developed by a clock generator 22, which produces the signal in phase and frequency synchronism with the color burst signal of the analog video signal provided by the video detector 16.

The digitized video signal produced by the A/D converter 20 is applied to an input of a digital comb filter 24, which may be constructed to operate as described in the article "Digital Television Image Enhancement" by John P. Rossi, 84 Journal of the SMPTE at 545–51 (1974). The comb filter 24 produces a separated luminance signal, Y, which is applied to a luminance signal processor (not shown).

The comb filter 24 also produces a separated chrominance signal C, consisting of a sequence of interleaved chrominance signal samples of different sampling phases, which is applied to the input of a chroma amplifier 32. The chroma amplifier 32 amplifies the chrominance signal in response to a viewer controlled color saturation control signal, and applies the amplified chrominance signal to the input of a digital chroma peaker 34. The chroma peaker 34 is a digital filter which modifies the response characteristic exhibited by the chrominance signal at this point to compensate for the response characteristic of the intermediate frequency circuits 14. The intermediate frequency circuits generally locate the color subcarrier frequency on the lower frequency slope of the I.F. passband, causing the color sidebands to exhibit a rolloff of 6 dB per octave. The chroma peaker 34 compensates for this rolloff to cause the chrominance signal to exhibit an essentially flat amplitude versus frequency response. If the I.F. circuits 14 are designed to provide an essentially flat amplitude versus frequency response for color signals, the chroma peaker 34 may be replaced by a chorma bandpass filter with a response characteristic located about the color subcarrier frequency.

The peaked or bandpassed digital chrominance signals are applied to a signal multiplexer 40. The signal multiplexer 40 includes a multiplexer switch 44, having inputs coupled to receive noninverted digital chrominance signals, and chrominance signals which have been inverted by an inverting circuit 42. The multiplexer switch 44 is switched at the color subcarrier frequency ($f_{sc}$) by a signal developed by the clock generator 22. The switch 44 alternately supplies inverted and uninverted chrominance signal samples at its output. For a $4f_{sc}$ sampling signal, the sequence of samples provided by the switch 44 consists of interleaved signal samples of two types in a quadrature relationship. The signal multiplexer 40 thereby accomplishes subcarrier frequency demodulation of the digital chrominance signals, with signal samples of the two types recurring at a $2f_{sc}$ rate. In this embodiment the chrominance signals have been demodulated to baseband although the interleaved components remain in a quadrature relationship.

The output of the signal multiplexer 40 is coupled to an input of a digital transversal filter and demodulator 50. The filter and demodulator 50 includes a serial shift register 52, weighting function circuits 60, a signal combiner 54, and a demultiplexer switch 70. The shift register 52 in this embodiment comprises a twelve-stage shift register with stages labeled $\tau_1$ through $\tau_{12}$. The chrominance signal samples produced at the output of the signal multiplexer 40 are applied to the first stage $\tau_1$ of the shift register 52 and to a weighting function circuit 61. In this example, the chrominance signal samples are shifted though the shift register 52 by the $4f_{sc}$ clock signal. The outputs of shift register stages $\tau_2$, $\tau_4$, $\tau_6$, $\tau_8$, $\tau_{10}$ and $\tau_{12}$ are tapped, with the output taps coupled to inputs of weighting function circuits 62, 63, 64, 65, 66 and 67, respectively. The outputs of the weighting function circuits 60 are coupled to inputs of the signal combiner 54, the output of which is coupled to the input of the demultiplexer switch 70. The demultiplexer switch 70 alternately selects signal samples produced by the signal combiner 54 in response to switching signals $\tfrac{1}{2}f_{sc}$(R-Y) and $\tfrac{1}{2}f_{sc}$(B-Y). These switching signals are produced by the clock generator 22 in a quadrature phase relationship, and have frequencies of half the color subcarrier frequency ($\tfrac{1}{2}f_{sc}$). The demultiplexer switch 70 produces filtered and demodulated color mixture signals (R-Y)' and (B-Y)' at its outputs, which may then be applied to a chrominance signal processor (not shown). The demultiplexer switch 70 thereby provides quadrature phase demodulation of filtered baseband color mixture signals.

Figure 2:
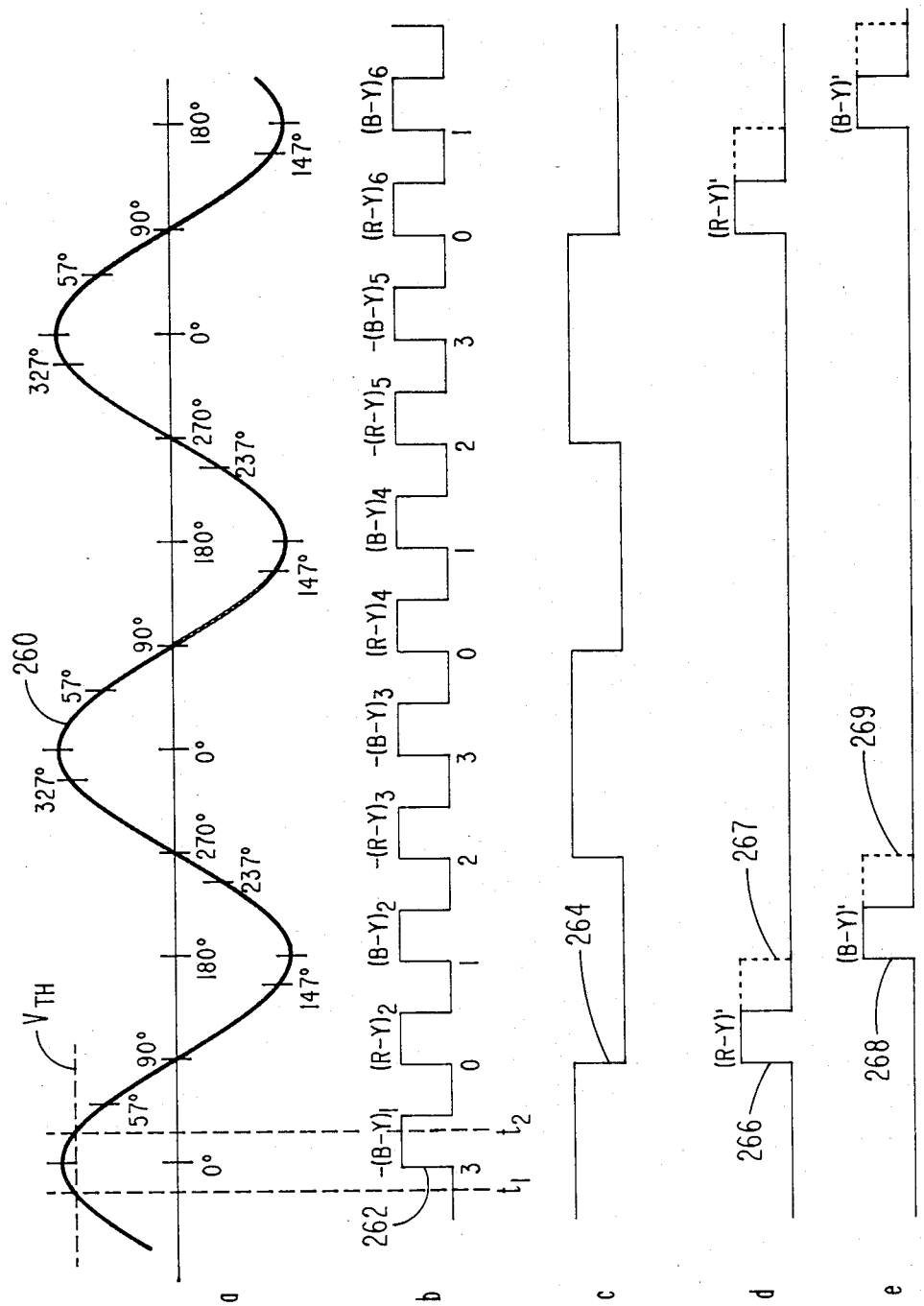
FIG. 2 illustrates waveforms depicting the operation of the arrangement of FIG. 1.

The operation of the arrangement of FIG. 1 may be understood by referring concurrently to the waveforms of FIG. 2. FIG. 2a shows a waveform 260, which corresponds to several cycles of the analog color burst signal, or a signal aligned in phase and frequency therewith. The clock generator 22 responds to the color burst signal by generating a $4f_{sc}$ sampling pulse train 262 for the A/D converter 20 and the shift register 52, as shown in FIG. 2b. When the video signal is sampled at the times of occurrence of the leading edges of the pulses of the pulse train 262, the discrete color signal samples will correspond to $-$(B-Y). (R-Y), (B-Y) and $-$(R-Y) over one subcarrier cycle, as indicated in FIG. 2b. A chrominance signal pulse train of this form is applied to the signal multiplexer 40.

The multiplexer switch 40 alternately couples pairs of uninverted and inverted chrominance signals to its output under control of the $f_{sc}$ switching signal, which is shown as waveform 264 in FIG. 2c. When the waveform 264 is "low," the multiplexer switch 44 passes uninverted signals through to its output, in this case the (R-Y) and (B-Y) samples occurring at 90° and 180° with respect to the burst waveform 260. When the waveform 264 in its "high" state, inverted signal samples from inverting circuit 42 are selected and coupled through to the multiplexer output. The inverting circuit converts the $-$(R-Y) and $-$(B-Y) samples to (R-Y) and (B-Y) samples at this time. Thus, the output of the signal multiplexer 40 is a continuous sequence of positive chrominance signal samples at a rate of four times the color subcarrier frequency, comprising baseband interleaved color mixture signals.

This sequence of chrominance signal samples is shifted into and through the shift register 52 by the $4f_{sc}$ signal. As the samples are shifted through the register, (B-Y) samples and (R-Y) samples are alternately applied to weighting function circuits 60. For instance, after one cycle of the $4f_{sc}$ signal, (B-Y) signal samples will be momentarily stored in the even-numbered shift register stages $\tau_2$, $\tau_4$, $\tau_6$, $\tau_8$, $\tau_{10}$ and $\tau_{12}$, and a (B-Y) sample will also be applied to weighting function circuit 61. (R-Y) signal samples will be stored in the untapped odd-numbered stages at this time. The tapped (B-Y) signal samples are then weighted by the weighting function circuits 60, and the tap-weighted signals are combined by the signal combiner 54, which produces a filtered (B-Y)

signal at its output. After the next cycle of the $4f_{sc}$ signal, the (R-Y) samples are shifted into the tapped stages and the (B-Y) samples are shifted to the untapped stages. The (R-Y) signal samples are then weighted and combined to produce a filtered (R-Y) signal at the output of combiner 54. Thus, a sequence of filtered and interleaved (B-Y) and (R-Y) signals are produced at the output of the signal combiner 54 at the $4f_{sc}$ signal rate. In this embodiment, the weighting function coefficient values are chosen to provide a lowpass filter response characteristic at the output of signal combiner 54, with a passband of approximately zero to 0.5 MHz.

The filtered chrominance signal sequence at the output of the signal combiner 54 is then simultaneously reduced in sampling rate and quadrature demodulated by sampling the signal sequence using differently phased signals of one-half the color subcarrier frequency. This is accomplished by the demultiplexer switch 70, in response to sampling signals $\frac{1}{2}f_{sc}$(R-Y) and $\frac{1}{2}f_{sc}$(B-Y). The $\frac{1}{2}f_{sc}$(R-Y) signal is shown as solid line waveform 266 in FIG. 2d, which samples the filtered signal sequence during the occurrence of an (R-Y) sample every other burst frequency cycle. Similarly, the $\frac{1}{2}f_{sc}$(B-Y) pulses shown by solid line waveform 268 of FIG. 2e sample the filtered signal sequence during the occurrences of filtered (B-Y) samples. Thus, the demultiplexer switch 70 produces filtered and demodulated output signals (R-Y)' and (B-Y)', with signal values being switched at a $\frac{1}{2}f_{sc}$ rate. The $\frac{1}{2}f_{sc}$ sampling rate allows a Nyquist bandwidth of 0.895 MHz in the NTSC system, which is sufficient for the zero to 0.5 MHz passband of the color mixture signals. The filtered output signals, which occur at one-half the color subcarrier rate, are thus substantially free of out of band noise and aliasing components, due to the 0.5 MHz cutoff frequency of the filter.

Figure 3:
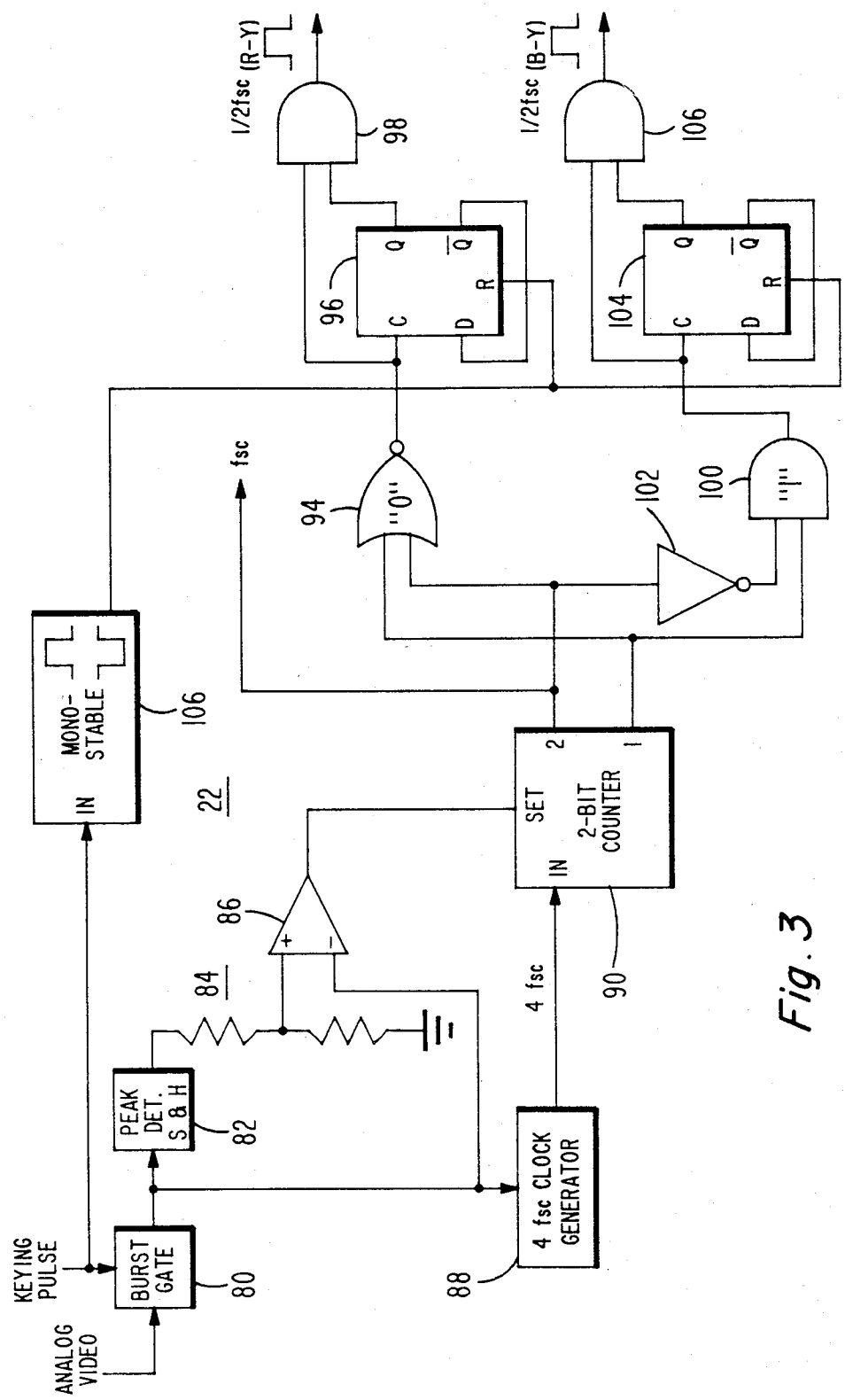
FIG. 3 illustrates, in block diagram form, a clock signal generator arrangement suitable for use in the arrangement of FIG. 1.

The clock generator 22 of FIG. 1 may be constructed as shown in FIG. 3. The analog video signal is applied to a burst gate 80, which is gated by a burst gate keying pulse to apply a gated burst signal to a peak detector sample-and-hold circuit 82, a comparator 86, and to a $4f_{sc}$ clock generator circuit 88. The $4f_{sc}$ clock generator circuit 88 may be constructed as shown in U.S. Pat. No. 4,415,918 entitled "Digital Color Television Signal Demodulator", and filed on Aug. 31, 1981. The $4f_{sc}$ clock generator circuit 88 produces a $4f_{sc}$ sampling signal, as shown in FIG. 2b. The peak detector sample- and -hold circuit 82 produces a threshold level substantially equal to the burst signal peak, which level is dropped across a voltage divider 84 to produce a threshold level $V_{TH}$, as shown in FIG. 2a. The $V_{TH}$ threshold level is applied to a second input of comparator 86. The $4f_{sc}$ sampling signal is applied to the signal input of a 2-bit counter 90, and the output of the comparator 86 is coupled to the "set" input of the counter 90.

The "2" output of the 2-bit counter 90 is coupled to the input of an inverter 102, and to one input of a NOR gate 94. The "1" output of the 2-bit counter 90 is coupled to a second input of NOR gate 94 and to one input of an AND gate 100. The output of inverter 102 is coupled to a second input of AND gate 100.

The output of NOR gate 94 is coupled to the "C" (clock) input of a D-type flip-flop 96 and to one input of an AND gate 98. The $\overline{Q}$ output of flip-flop 96 is coupled to the "D" (data) input of the flip-flop, and the Q output of the flip-flop 96 is coupled to a second input of AND gate 98. The output of AND gate 100 is coupled to the C input of flip-flop 104, and to one input of an AND gate 106. The Q output of flip-flop 104 is coupled to a second input of AND gate 106, and the $\overline{Q}$ output of the flip-flop 104 is coupled to the D input of the flip-flop. The burst gate keying pulse is applied to the input of a monostable multivibrator 106, which has an output coupled to the reset inputs of flip-flops 96 and 104.

In operation, the 2-bit counter 90 counts the pulses of the $4f_{sc}$ sampling signal. The count of the counter 90 is synchronized during each burst interval by the comparator 86. The comparator 86 produces an output pulse during each cycle of the burst signal when the burst signal 260 at the negative input of the comparator exceeds the $V_{TH}$ threshold during the time interval $t_1-t_2$ shown in FIG. 2b. The comparator pulse holds the counter 90 in its set condition during this time interval, at which time the counter output is three. After time $t_2$, the counter 90 resumes counting with the leading edge of pulse (R-Y)$_2$ in FIG. 2b. The counter 90 is thereby synchronized to produce a count of one for every (B-Y) sample, a count of two for every $-$(R-Y) sample, a count of three for every $-$(B-Y) sample, and a count of zero for every (R-Y) sample, as indicated by the counter numbers shown below waveform 262 in FIG. 2b.

With the counter 90 operating in this sequence, the "2" output of the counter will exhibit an output signal which is illustrated by waveform 264 of FIG. 2c. This signal is the desired $f_{sc}$ sampling signal for the signal multiplexer 40. The NOR gate 94 receives the counter output signals and produces a "high" signal during every "zero" count. The signal produced by NOR gate 94 will alternately set and reset flip-flop 96, which alternately enables and disables AND gate 98 during alternate cycles of the color burst signal. Flip-flops 96 and 104 are synchronized by a reset pulse provided by monostable multivibrator 106 at the beginning of every burst gate interval. This ensures that the flip-flops will be set during the first cycle of burst, and every other cycle of burst thereafter. Thus, AND gate 98 produces output pulses during alternate zero counts of the counter 90. The output signal of AND gate 98 is the desired $\frac{1}{2}f_{sc}$(R-Y) signal for demultiplexer switch 70, and exhibits a waveform as shown in FIG. 2d, with leading edges occurring at the times of the leading edges of the solid line pulses, and falling edges occurring a shown by the broken line 267.

In a similar manner, AND gate 100 produces pulses during each "one" count of the counter 90. Alternate ones of these pulses are passed by AND gate 106 when it is enabled by flip-flop 104. The output signal of AND gate 106 is the desired $\frac{1}{2}f_{sc}$(B-Y) signal for demultiplexer switch 70, with leading edges occurring at the times of the leading edges of solid line pulses 268 of FIG. 2e, and trailing edges occurring as shown by broken line falling edges 269.

Figure 4:
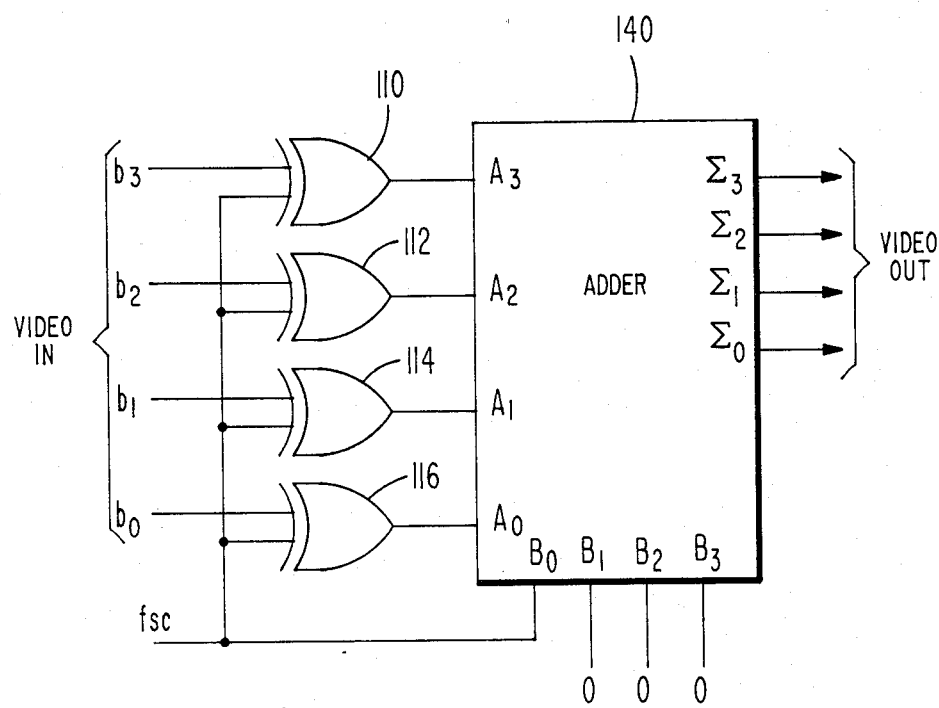
FIG. 4 illustrates, in block diagram form, a signal multiplexer arrangement suitable for use in the arrangement of FIG. 1.

The signal multiplexer 40 of FIG. 1 may be constructed as shown in FIG. 4. The arrangement of FIG. 4 is constructed for four-bit signals, but may be readily extended for digital words of greater bit lengths.

In FIG. 4, the bits of the digital chrominance signal produced by the chroma peaker 34 are applied in parallel to inputs of exclusive-OR gates 110, 112, 114 and 116. In this example of four-bit words, the least significant bit $b_0$ is applied to the input of exclusive-OR gate 116, bits $b_1$ and $b_2$ are applied to exclusive-OR gates 114 and 112, and the most significant bit $b_3$ is applied to exclusive-OR gate 110. The outputs of the respective exclusive-OR gates are applied to inputs $A_0$, $A_1$, $A_2$ and $A_3$ of an adder 140. The exclusive-OR gates 110, 112, 114 and 116 are also coupled to receive the $f_{sc}$ signal, which signal is also applied to input $B_0$ of the adder 140. The remaining "B" inputs $B_1$, $B_2$ and $B_3$ are coupled to receive a logical "0" signal level. The output of the signal multiplexer is produced at adder outputs $\Sigma_0$, $\Sigma_1$, $\Sigma_2$ and $\Sigma_3$.

In operation, when the $f_{sc}$ signal 264 is low during the occurrence of positive chrominance signal samples (R-Y), and (B-Y), as shown in FIGS. 2b and 2c, the signal samples are passed uninverted to the adder 140, where they are added to a value of 0000 at the "B" inputs of the adder. The signal samples produced at the adder outputs thus have the same values as the input signals to the multiplexer.

During the occurrence of negative chrominance signal samples −(R-Y) and −(B-Y), the high state of the $f_{sc}$ signal causes the exclusive-OR gates 110, 112, 114 and 116 to invert the bit values of the applied chrominance signal samples. The input signal samples are then applied in inverted form to the "A" inputs of the adder 140, which adds the inverted samples to a value of 0001 at the "B" inputs of the adder. The adder thereby produces a two's complemented version of the input signals, which converts the negative chrominance signal samples to positive signal samples.

It may be noted that the function of the adder 240 of FIG. 4 is to add a value of one least significant bit to inverted chrominance signal samples. The arrangement of FIG. 4 may be simplified if desired by eliminating the adder and applying the output signals of the exclusive-OR gates to the digital filter 50 directly. This, however, causes a one-bit "error" in the output signals of the multiplexer 40 during every pair of inverted signal samples. But since this "error" recurs at the rate of the inverted signal samples, which is the subcarrier rate, it will be effectively eliminated by the digital filter, which exhibits a passband cutoff below the subcarrier frequency.

Figure 5:
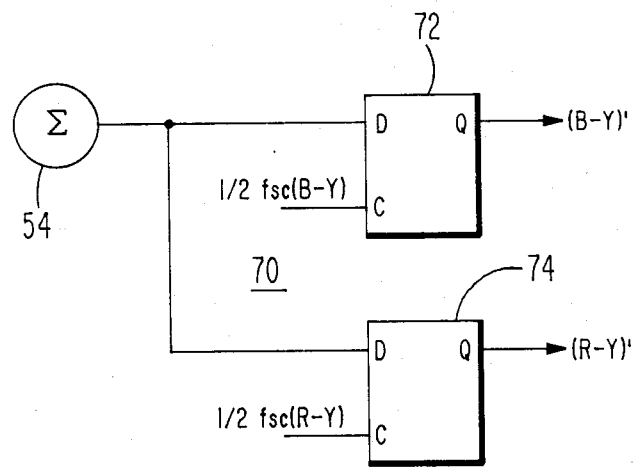
FIG. 5 illustrates, in block diagram form, a more detailed embodiment of the output switch of the arrangement of FIG. 1.

The demultiplexer switch 70 may be constructed as shown in FIG. 5. The output of signal combiner 54 is coupled in parallel to the D inputs of D-type flip-flops 72 and 74. The flip-flop 72 is clocked by the $\frac{1}{2}f_{sc}$(B-Y) signal at its C input, and the flip-flop 74 is clocked by the $\frac{1}{2}f_{sc}$(R-Y) signal at its C input. Filtered and demodulated signals (B-Y)' and (R-Y)' are produced at the Q outputs of the flip-flops. If the output signals of the signal combiner 54 comprise eight-bit digital words, each flip-flop will be replicated eight times, thereby forming an eight-bit latch for each output. If it is desirable to maintain the demodulated and filtered signals in a single sequence for subsequent signal processing, only one eight-bit latch may be used. This latch would be clocked by ANDed signals $\frac{1}{2}f_{sc}$(B-Y) and $\frac{1}{2}f_{sc}$(R-Y). It may be further desirable, in such an arrangement, to change the phase of one of the sampling signals so that the filtered signals are sampled on alternate burst cycles instead of the same cycle as shown in FIGS. 2d and 2e.

Figure 6:
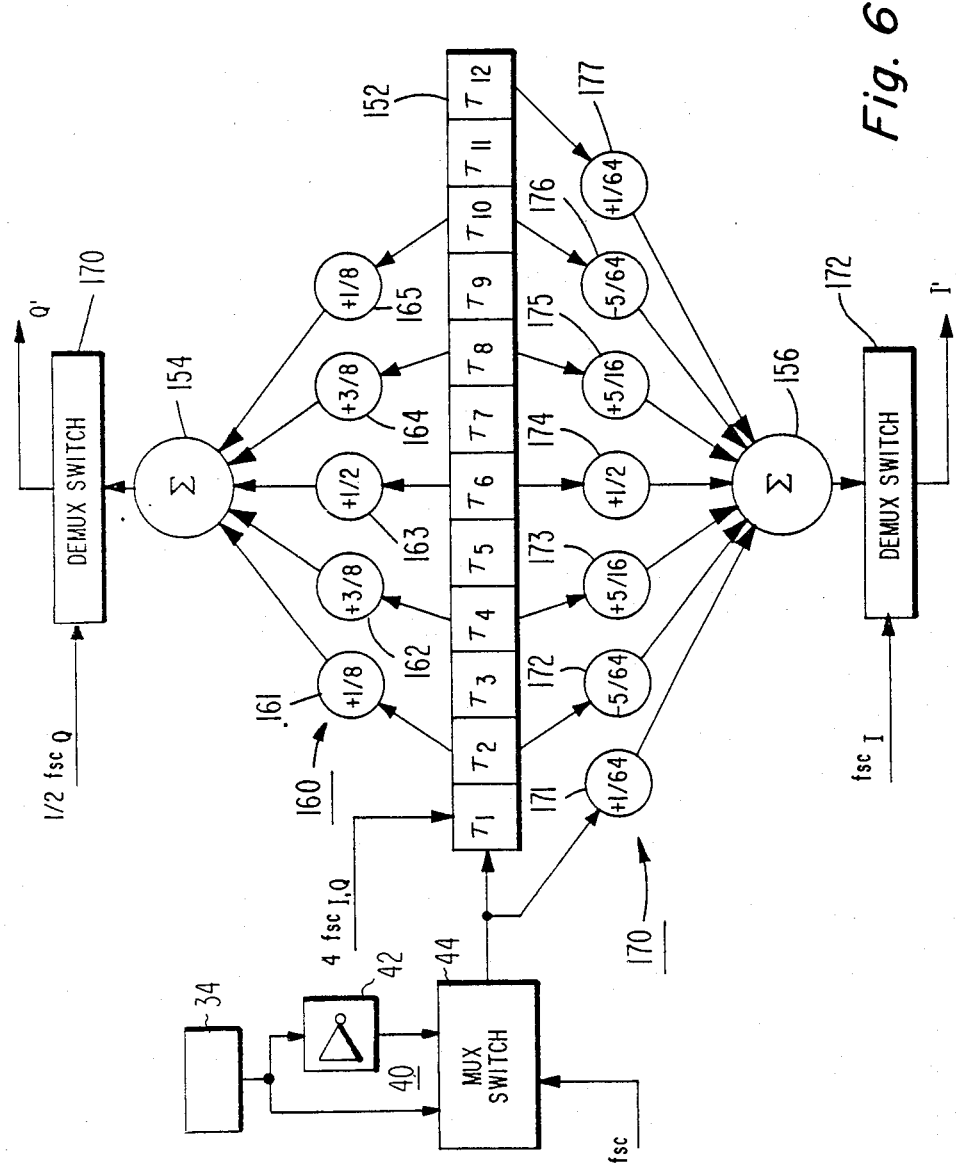
FIG. 6 illustrates, in block diagram form, a further embodiment of a filtering and demodulation system constructed in accordance with the principles of the present invention.

A second filter and demodulation system, constructed in accordance with the principles of the present invention, is shown in FIG. 6. In FIG. 6, the output of the multiplexer switch 44 of FIG. 1 is coupled to the input of the first stage $\tau_1$ of a shift register 152. The shift register is clocked by a $4f_{scI,Q}$ sampling signal. Even-numbered stages $\tau_2$, $\tau_4$, $\tau_6$, $\tau_8$, $\tau_{10}$ and $\tau_{12}$ have output taps coupled to weighting function circuits 172, 173, 174, 175, 176 and 177, respectively. The input of the first stage $\tau_1$ is coupled to a weighting function circuit 171. The outputs of these weighting function circuits 170 are coupled to inputs of a signal combiner 156, the output of which is coupled to the input of a demultiplexer switch 172. The demultiplexer swich 172 is clocked by a sampling signal $f_{scI}$.

The output taps of even-numbered shift register stages $\tau_2$, $\tau_4$, $\tau_6$, $\tau_8$ and $\tau_{10}$ are coupled to inputs of weighting function circuits 161, 162, 163, 164 and 165, respectively. The outputs of these weighting function circuits 160 are coupled to inputs of a signal combiner 154, the output of which is coupled to the input of a demultiplexer switch 170. The demultiplexer switch 170 is clocked by a sampling signal $\frac{1}{2}f_{scQ}$.

Figure 7:
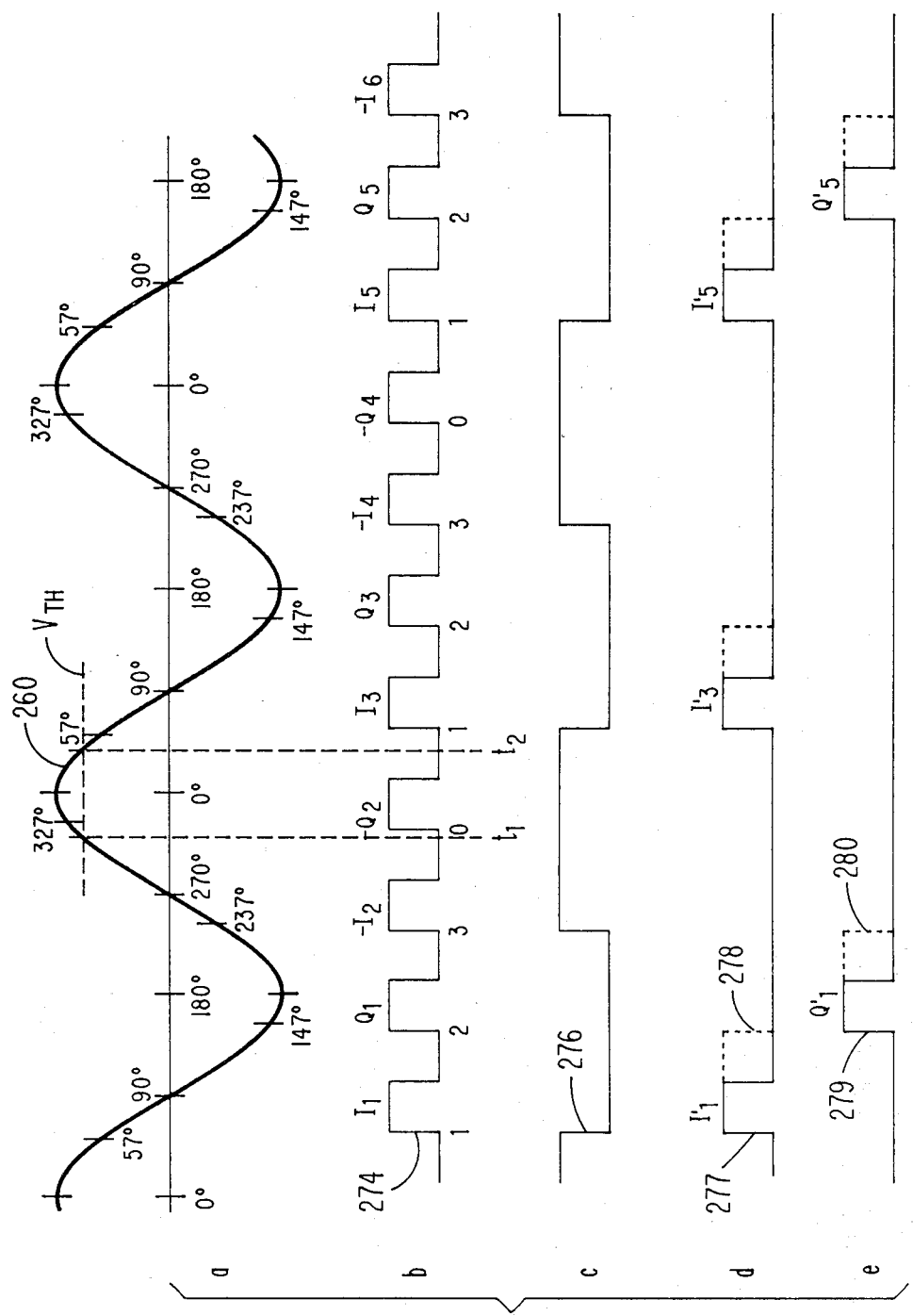
FIG. 7 illustrates waveforms depicting the operation of the arrangement of FIG. 6.

The operation of the arrangement of FIG. 6 may be understood by referring concurrently to the waveforms of FIG. 7. Waveform 260 of FIG. 7a illustrates a signal aligned in phase and frequency synchronism with the color burst signal component of the analog video signal. The analog video signal is digitally encoded by sampling the video signal with $4f_{scI,Q}$ sampling signal which is aligned in phase with the I axis of the color burst signal. The separated chrominance signal samples are thereby produced at the output of digital chroma peaker 34 in the sequence I, Q, −I, −Q, as represented by waveform 274 of FIG. 7b. The signal multiplexer 40, including inverting circuit 42 and multiplexer switch 44, then inverts the negative signal samples to produce a positive sample sequence of the form I, Q, I, Q. This signal multiplexer is again controlled by an $f_{sc}$ sampling signal, represented by waveform 276 of FIG. 7c. The I and Q samples of the positive sample sequence recur at a $2f_{sc}$ rate.

The sequence of I and Q chrominance signal samples is shifted into and through the shift register 152 by the $4f_{scI,Q}$ signal. The shift register will assume alternate conditions after successive shifts wherein I signal samples will be stored in the even-numbered stages, or Q signal samples will be stored in the even-numbered stages. In the first condition, an I signal is applied to the input of weighting function circuit 171, and I signals located in stages $\tau_2$, $\tau_4$, $\tau_6$, $\tau_8$, $\tau_{10}$ and $\tau_{12}$ are tapped and applied to weighting function circuits 172, 173, 174, 175, 176 and 177, respectively. The tap-weighted signals produced by the weighting function circuits 170 are combined by signal combiner 156 to produce a filtered I signal, I'. The values of the weighting function coefficients of circuits 170 are selected to provide a lowpass filter response characteristic at the output of signal combiner 156 which exhibits a passband of approximately zero to 1.5 MHz. The filtered I signals at the output of signal combiner 156 are sampled by an $f_{scI}$ sampling signal at the color subcarrier rate which, in accordance with the Nyquist criterion, allows a bandwidth of 1.79 MHz in the NTSC system. The $f_{scI}$ sampling signal is applied to the demultiplexer switch 172, which produces an output signal sequence of the form $I_1'$, $I_3'$, $I_5'$. . ., as illustrated in FIG. 7d.

During the second condition, Q signal samples are shifted into the even-numbered stages. Q signal samples are tapped from stages $\tau_2$, $\tau_4$, $\tau_6$, $\tau_8$, and $\tau_{10}$, and applied to weighting function circuits 161, 162, 163, 164 and 165, respectively. Tap-weighted Q signal samples at the outputs of the weighting function circuits 160 are combined by signal combiner 154 to produce a filtered Q signal, Q'. The values of the weighting function coefficients of circuits 160 are selected to provide a lowpass filter response characteristic at the output of signal combiner 154 which exhibits a passband of approximately zero to 0.5 MHz. The filtered Q signals at the output of signal combiner 154 as sampled by a ½$f_{scQ}$ sampling signal at one-half the color subcarrier rate, which allows a Nyquist bandwidth of 0.895 MHz in the NTSC system. The ½$f_{scQ}$ sampling signal controls the demultiplexer switch 170, which produces an output signal sequence of the form $Q_1'$, $Q_5'$, $Q_9'$, ... as illustrated in FIG. 7c. Thus, the arrangement of FIG. 6 attenuates out of band noise, and demodulates I and Q color mixture signals of unequal bandwidths.

Moreover, the embodiments of FIGS. 1 and 6 require only a single filter shift register by taking advantage of the interleaved nature of the color mixture signals, which are both filtered and demodulated. The filter provides a good signal-to-noise ratio by virtue of the clocking of two samples of each type of color mixture signal into the filter every color subcarrier cycle.

Figure 8:
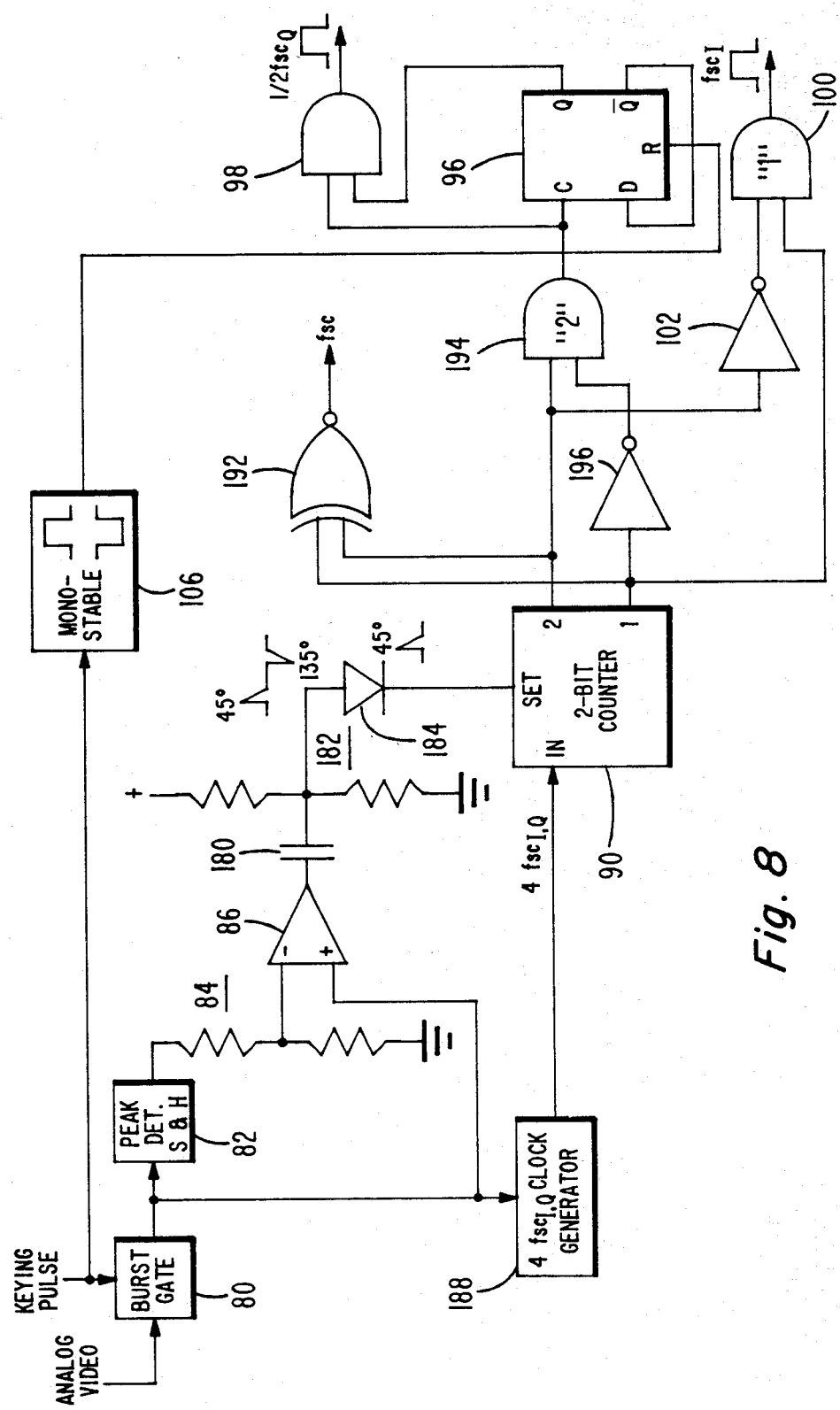
FIG. 8 illustrates, in block diagram form, a clock signal generator arrangement suitable for use with the arrangement of FIG. 6.

The arrangement of FIG. 6 will operate in combination with a signal multiplexer 40, constructed in accordance with the principles of the multiplexer arrangement of FIG. 4. The demultiplexer switches 170 and 172 may each comprise a single latch register instead of the dual latch register shown in FIG. 5. The clock generator arrangement of FIG. 3, however, requires some modification for I and Q filtering and demodulation, as illustrated by the arrangement of FIG. 8. Elements of FIG. 3 are reproduced in FIG. 8, and bear the same reference numerals.

In FIG. 8, the burst gate 80, the peak detector sample-and -hold circuit 82, the monostable multivibrator 106, and the voltage divider 84, are arranged and operate as described in FIG. 3. The clock generator 188 of FIG. 8 is responsive to the burst signal for generating a 4$f_{sc}$ sampling rate signal, 4$f_{scI,Q}$, which is aligned in phase with the I axis of the burst signal. The clock generator 188 may be comstructed as described in the aformentioned U.S. Pat. No. 4,415,918. The 4fsc$_{I,Q}$ sampling signal is applied to the signal input of the 2-bit counter 90. The output of the comparator 86 is coupled to the set input of the counter 90 by the series combination of a capacitor 180 and a diode 184. A voltage divider 182 provides a D.C. bias at the junction of capacitor 180 and diode 184.

The "1" and "2" outputs of the counter 90 are coupled to inputs of an exclusive-NOR gate 192. The "2" output is also coupled to an input of an AND gate 194, and to the input of inverter 102. The "1" output of the counter 90 is coupled to the input of an inverter 196, and to an input of AND gate 100. The output of inverter 196 is coupled to a second input of AND gate 194, and the output of inverter 102 and is coupled to a second input of AND gate 194, and the output of inverter 102 is coupled to a second input of AND gate 100. D type flip-flop 96 and AND gate 98 are coupled to the output of AND gate 194, and are otherwise coupled as shown in FIG. 3.

In operation, counter 90 counts pulses of the 4$f_{scI,Q}$ signal provided by the clock generator 188. The output signal of the comparator once again synchronizes the counter during the color burst intervals. When the burst signal exceeds the threshold level $V_{TH}$, as shown at time $t_1$ in FIG. 7a, the output signal of the comparator 86 goes positive, and remains in that state until a later time $t_2$. The threshold level $V_{TH}$ is adjusted so that time $t_1$ occurs before the burst signal reaches the Q axis phase of 327°, such as a phase of 315°. The positive pulse produced by the comparator 86 is differentiated by capacitor 180, producing a short positive-going pulse at time $t_1$, and a short negative-going pulse at time $t_2$, as shown in FIG. 8. The positive-going pulse is coupled to the set input of the counter 90 by diode 184 to set the counter to three at time $t_1$. The diode also clips the negative-going pulse, preventing it from reaching the counter 90. Thus, the counter 90 is synchronized to count the I pulses of FIG. 7b as one, the Q pulses as two, the $-I$ pulses as three, and the $-Q$ pulses as zero.

With the counter 90 synchronized in this manner, the exclusive-NORing of the counter outputs by gate 192 will produce the desired $f_{sc}$ signal for the signal multplexer 40, as shown by waveform 276 of FIG. 7c. The AND gate 100 will produce a pulse at a count of one every burst cycle, which corresponds to the desired $f_{scI}$ sampling signal. The output of AND gate 100 will go high in coincidence with the leading edge of solid-line pulse 277 of FIG. 7d, and will go low as shown by broken line transition 278. The AND gate 194 will produce an output pulse during the count of two every burst cycle. Alternate ones of these pulses are produced at the output of AND gate 98, with leading edges coincident with the leading edge of solid-line pulse 279 of FIG. 7e and trailing edges represented by broken line 280. The signal produced by AND gate 98 is the ½$f_{scQ}$ sampling signal.

What is claimed is:

1. In a television signal receiver, including a source of digital chrominance signals modulated in phase and frequency, apparatus for producing a plurality of filtered and demodulated digital color signals comprising:
   means, having an input coupled to said source to receive said digital chrominance signals, and an output, for producing baseband digital color signals of interleaved sampling phases;
   a digital filter, having an input coupled to receive said baseband digital color signals, and an output, and exhibiting a response characteristic which is substantially equal to the desired passband of said demodulated digital color signals; and
   means, coupled to the output of said digital filter, for producing said plurality of filtered and demodulated digital color signals.

2. The arrangement of claim 1, wherein said filtered and demodulated digital color signal producing means includes means for demultiplexing said baseband digital color signals of interleaved sampling phases to produce said plurality of demodulated digital color signals, each representing a particular sampling phase.

3. The arrangement of claim 2, wherein said digital chrominance signals modulate a color subcarrier having a predetermined frequency, and wherein said means for producing said baseband digital color signals of interleaved sampling phases includes means for demodulating said digital chrominance signals from said color subcarrier to form baseband digital color signals.

4. The arrangement of claim 3, further including a first source of clock signals of a multiple of the color subcarrier frequency and in phase synchronism therewith;
   a second source of clock signals of a submultiple of the frequency of said clock signals of said first source and in phase synchronism therewith; and
   a third source of clock signals of a submultiple of the frequency of said clock signals of said second source and in phase synchronism therewith;
   wherein said source of digital chrominance signal is responsive to clock signals from said first source for producing said digital chrominance signals modulated in phase and frequency, said demultiplexing means is responsive to clock signals from said third source to produce said plurality of demodulated digital color signals, each representing a particular sampling phase, and said demodulating means is responsive to clock signals from said second source for producing said baseband digital color signals of interleaved sampling phases.

5. In a television signal receiver, including a source of digital chrominance signal samples which produces a sequence of signal samples of first and second sampling phases, a digital filtering and sampling system comprising:
   a digital filter, including
      a shift register coupled to receive said sequence of signal samples, and including a first plurality of tapped shift register stages, respective ones of which are separated by ones of a second plurality of shift register stages;
      a plurality of weighting function circuits coupled to ones of said first plurality of tapped shift register stages; and
      means, coupled to said weighting function circuits, for producing a sequence of filtered chrominance signal samples; and
   means, coupled to said digital filter, for sampling said sequence of filtered chrominance signal samples to produce a first filtered chrominance signal when said first plurality of tapped shift register stages contains chrominance signal samples of said first sampling phase, and a second filtered chrominance signal when said first plurality of tapped shift register stages contains chrominance signal samples of said second sampling phase.

6. The apparatus of claim 5 further comprising:
   a first clock signal generator, coupled to said shift register, for shifting said sequence of digital chrominance signals through said shift register at a first rate; and
   a second clock signal generator, coupled to said sampling means, for supplying a clock signal of a rate which is less than said first rate.

7. In a television receiver for processing video signals including a chrominance signal which modulates a subcarrier of predetermined frequency, said receiver including a source of digital chrominance signals which produces a sequence of color mixture signals of first and second types, apparatus for producing filtered and sampled color mixture signals comprising:
   first and second digital filters, including a common shift register coupled to receive said sequence of color mixture signals from said source, and having first and second outputs exhibiting different response characteristics;
   means responsive to said subcarrier for generating first and second sampling signals synchronous therewith;
   means, coupled to said output of said first digital filter, and responsive to said first sampling signal for sampling signals provided by said first digital filter at a rate which is at least as great as the Nyquist criterion of said color mixture signals of said first type, and providing at an output thereof a filtered and demodulated color mixture signal of said first type; and
   means, coupled to said output of said second digital filter, and responsive to said second sampling signal for sampling signals provided by said second digital filter at a rate which is at least as great as the Nyquist criterion of said color mixture signals of said second type and providing at an output port thereof a filtered and demodulated color mixture signal of said second type.

8. In a television receiver for processing video signals including a chrominance signal which modulates a subcarrier, said receiver including a source of digital chrominance signals which produces a sequence of alternating color mixture signals of first and second sampling phases, a digital color mixture signal filtering and sampling system comprising:
   a shift register having an input coupled to receive said sequence of color mixture signals and including a plurality of tapped shift register stages;
   a first plurality of weighting function circuits coupled to ones of said plurality of tapped shift register stages;
   a second plurality of weight function circuits coupled to ones of said plurality of tapped shift register stages;
   means, coupled to said first plurality of weighting function circuits for producing a first sum of tap-weighted signals;
   means, coupled to said second plurality of weighting function circuits for producing a second sum of tap-weighted signals;
   a clock generator responsive to said subcarrier for generating first and second clock signals synchronous with said subcarrier;
   means, coupled to said first sum signal producing means, and said clock generator and responsive to said first clock signal for sampling said first sum signal when said first plurality of weighting function circuits is receiving color mixture signals of said first sampling phase; and
   means, coupled to said second sum signal producing means, and said clock generator and responsive to said second clock signal for sampling said second sum signal when said second plurality of weighting function circuits is receiving color mixture signals of said second sampling phase.

9. In a television receiver, including a source of digital chrominance signals; a first clock generator which produces a first clock signal at a given rate; a second clock generator which produces a second clock signal at a rate which is less than said given rate and exhibits a given phase; and a third clock generator which produces a third clock signal at a rate which is less than said given rate and exhibits a different phase than said given phase; a chrominance signal filtering and sampling arrangement comprising:
   first and second digital filters, including a common shift register having an input coupled to receive said digital chrominance signals and responsive to said first clock signal for shifting said digital chrominance signals through said common shift register, and having first and second outputs exhibiting different response characteristics;
   means, coupled to said first output, for sampling signals provided thereat in response to said second clock signal, and producing a first color mixture signal at an output port thereof; and
   means, coupled to said second output, for sampling signals provided thereat in response to said third clock signal, and producing a second color mixture signal at an output port thereof.

10. In a television signal receiver, including a source of composite video signals including a burst signal component, aparatus comprising:

means, coupled to said signal source, for sampling said composite video signals at a multiple of the frequency of said burst signal and in predetermined phase relationship therewith, to produce a sequence of signal samples of a plurality of phases;

means, coupled to said sampling means, for separating the luminance and chrominance portions of said signal samples to produce a sequence of chrominance signal samples of a plurality of phases;

means, coupled to said separating means, for demodulating said chrominance signal samples of said plurality of phases from the frequency region about said burst signal frequency to produce baseband chrominance signal samples of a plurality of sampling phases;

a digital filter, including:

a shift register coupled to receive said baseband chrominance signal samples, said shift register including a plurality of shift register stages arranged to sequentially store said baseband chrominance signal samples of said plurality of sampling phases, and means for arithmetically combining baseband chrominance signal samples from said plurality of shift register stages to produce a sequence of filtered chrominance signal samples of said plurality of sampling phases; and means for demultiplexing said sequence of filtered chrominance signal samples to produce a plurality of signals, each representing a particular sampling phase.

11. In a television signal receiver, including a source of digital chrominance signals which produces a sequence of color mixture signals of different polarities, apparatus for producing filtered digtal chrominance signals comprising:

means, having an input coupled to receive said sequence of color mixture signals from said source, and having an output, for producing filtered digital chrominance signals, said filter exhibiting a response characteristic which attenuates noise signal components outside the bandwidth of said color mixture signals; and filter, for sampling signals provided at said output at a rate which is at least as great as the Nyquist criterion of said color mixture signal bandwidth for producing a filtered, demodulated color mixture signal at an output port thereof.

* * * * *

UNITED STATES PATENT AND TRADEMARK OFFICE
CERTIFICATE OF CORRECTION

PATENT NO. : 4,502,074
DATED : Feb. 26, 1985
INVENTOR(S) : Glenn A. Reitmeier

It is certified that error appears in the above-identified patent and that said Letters Patent is hereby corrected as shown below:

Column 8, line 40    "$\tau 12$" should be --$\tau_{12}$--.

Column 9, line 35    "comstructed" should be --constructed--.

Column 14, line 21   after "and" and before "filter", insert
the following para.  --means, coupled to said output of said digital--.

Signed and Sealed this

Thirtieth Day of July 1985

[SEAL]

Attest:

DONALD J. QUIGG

Attesting Officer    Acting Commissioner of Patents and Trademarks